(12) United States Patent
Wappler et al.

(10) Patent No.: US 9,400,964 B2
(45) Date of Patent: Jul. 26, 2016

(54) METHOD FOR PREDICTING ASSET AVAILABILITY

(71) Applicant: SURGERE, INC., Green, OH (US)

(72) Inventors: William J. Wappler, North Canton, OH (US); David J. Horvat, Moreland Hills, OH (US)

(73) Assignee: Surgere, Inc., Green, OH (US)

( * ) Notice: Subject to any disclaimer, the term of this patent is extended or adjusted under 35 U.S.C. 154(b) by 257 days.

(21) Appl. No.: 14/171,130

(22) Filed: Feb. 3, 2014

(65) Prior Publication Data

US 2015/0154525 A1  Jun. 4, 2015

Related U.S. Application Data

(63) Continuation-in-part of application No. 14/096,466, filed on Dec. 4, 2013.

(51) Int. Cl.
| | |
|---|---|
| G08B 13/14 | (2006.01) |
| G08B 1/08 | (2006.01) |
| G06Q 10/06 | (2012.01) |
| G06Q 10/08 | (2012.01) |

(52) U.S. Cl.
CPC ........ *G06Q 10/06315* (2013.01); *G06Q 10/087* (2013.01)

(58) Field of Classification Search
CPC ....................... G06Q 10/06315; G06Q 10/087
See application file for complete search history.

(56) References Cited

U.S. PATENT DOCUMENTS

| | | | |
|---|---|---|---|
| 6,148,291 A | 11/2000 | Radican | |
| 7,102,509 B1 | 9/2006 | Anders et al. | |
| 7,518,511 B1* | 4/2009 | Panja | G06Q 10/08 340/539.13 |
| 2002/0073114 A1 | 6/2002 | Nicastro et al. | |
| 2007/0268138 A1* | 11/2007 | Chung | G01S 5/0018 340/572.1 |
| 2008/0174432 A1 | 7/2008 | Ulrich | |
| 2009/0024491 A1 | 1/2009 | Choubey | |
| 2011/0010275 A1 | 1/2011 | Hull | |
| 2012/0268253 A1* | 10/2012 | Tuttle | G01S 11/10 340/10.1 |
| 2013/0162459 A1 | 6/2013 | Aharony et al. | |
| 2013/0257594 A1 | 10/2013 | Collins | |
| 2015/0051941 A1* | 2/2015 | Bell | G06Q 10/06313 705/7.25 |

* cited by examiner

*Primary Examiner* — Jennifer Mehmood
*Assistant Examiner* — John Mortell
(74) *Attorney, Agent, or Firm* — Sand & Sebolt

(57) ABSTRACT

The present invention is directed to a method for predicting asset availability in a supply chain, whereby assets are typically reusable assets such as packaging or bins which are expensive components yet hard to track. The present invention provides a mechanism for passively sensing when an asset enters or leaves a particular location in the supply chain and updates a database accordingly. This location and timing information is thereafter used in the present invention to model future movement of the assets for use in predicting whether a sufficient amount of the assets will be present at any particular location in the supply chain at any particular point in the future. An alert is generated if the modeling determines an insufficient amount is modeled to be present at the particular location. This allows a decision maker to make adjustments to ensure a sufficient amount of assets will be present at the particular location.

19 Claims, 11 Drawing Sheets

| Item identifier | Antenna 1 peak time | Antenna 2 peak time | Loaded into warehouse | Loaded into vehicle | Expected Direction |
|---|---|---|---|---|---|
| 00246 | 11:22:08:12 | 11:22:09:14 | Yes | NULL | into warehouse |
| 00247 | 11:23:10:45 | 11:23:11:47 | Yes | NULL | into warehouse |
| 00248 | NULL | NULL | NULL | NULL | into vehicle |
| 00249 | 11:25:03:12 | 11:25:01:81 | NULL | Yes | into warehouse |

FIG-4

| Item identifier | Antenna 1 peak time | Antenna 2 peak time | Loaded into warehouse | Loaded into vehicle | Expected Direction |
|---|---|---|---|---|---|
| 00246 | 11:22:08:12 | 11:22:09:14 | Yes | NULL | into warehouse |
| 00247 | 11:23:10:45 | 11:23:11:47 | Yes | NULL | into warehouse |
| 00248 | NULL | NULL | NULL | NULL | into vehicle |
| 00249 | 11:25:03:12 | 11:25:01:81 | NULL | Yes | into warehouse |

Locations Table 227

| Key 233 | Location Name 235 | Current Average Dwell Time 237 | Maximum Dwell Time 239 |
|---|---|---|---|
| A — 1 | Manufacturing plant | 3.3 days | 4 days |
| B — 2 | En route to warehouse from manufacturing plant | 1.2 days | 2 days |
| C — 3 | Warehouse | 12.9 days | 12 days |
| D — 4 | En route to assembly facility from warehouse | 2.2 days | 5 days |
| E — 5 | Assembly facility | 3.4 days | 5 days |
| F — 6 | En route to manufacturing plant | 1.1 days | 2 days |

FIG—8

Asset Table 229

| Key 241 | Tag Identifier 243 | Current Location Key 245 | Time In 247 | Asset Type 249 |
|---|---|---|---|---|
| A — 1 | 899 | 1 | 10/9/2013 | Large Bin |
| B — 2 | 831 | 3 | 10/29/2013 | Large Bin |
| C — 3 | 345 | 3 | 10/23/2013 | Small Bin |
| D — 4 | 641 | 2 | 10/22/2013 | Wheeled Rack |
| E — 5 | 693 | 5 | 11/2/2013 | Large Bin |

FIG—9

Asset History Table (231)

| Key (251) | Asset Key (253) | Location Key (255) | Time In (257) | Time Out (259) | Dwell Time (261) |
|---|---|---|---|---|---|
| 1 | 1 | 1 | 9/15/2013 | 9/18/2013 | 3 days |
| 2 | 1 | 2 | 9/18/2013 | 9/19/2013 | 1 day |
| 3 | 1 | 3 | 9/19/2013 | 10/1/2013 | 12 days |
| 4 | 1 | 4 | 10/1/2013 | 10/3/2013 | 2 days |
| 5 | 1 | 5 | 10/3/2013 | 10/7/2013 | 4 days |
| 6 | 1 | 6 | 10/7/2013 | 10/9/2013 | 2 days |
| 7 | 2 | 1 | 10/7/2013 | 10/9/2013 | 2 days |
| 8 | 2 | 2 | 10/9/2013 | 10/10/2013 | 1 days |
| 9 | 2 | 3 | 10/10/2013 | 10/21/2013 | 11 days |
| 10 | 2 | 4 | 10/21/2013 | 10/25/2013 | 4 days |
| 11 | 2 | 5 | 10/25/2013 | 10/29/2013 | 4 days |

FIG–10

Common Database Queries

| Query | Answer |
|---|---|
| Q1 — Average turn time for Asset 1 at Location 1? | 24.2 days — A1 |
| Q2 — Percentage of asset fleet passing through location 3 from 10/11/2013 to 10/19/2013? | 42% — A2 |
| Q3 — Current dwell time for Asset 3? | 10 days — A3 |
| Q4 — Current location of Asset 4? | En route to warehouse from manufacturing plant — A4 |

FIG-11

Sample Dwell Times Report (262)

| Asset ID | Location 1 Dwell Time | Location 2 Dwell Time | Location 3 Dwell Time | Location 4 Dwell Time |
|---|---|---|---|---|
| 1 | 1 day | 13 days | 2 days | 2 days |
| 2 | 2 days | 13 days | 2 days | 3 days |
| 3 | 1 day | 14 day | 2 days | 3 days |
| 4 | 2 days | 12 days | 2 days | 4 days |
| 5 | 2 days | 14 days | 2 days | 3 days |
| 6 | 2 days | 12 days | 2 days | 3 days |
| Average Dwell Time | 1.667 days | 13 days | 2 days | 3 days |

Sample Production Schedule

| ID | Task | Predecessor(s) | Duration |
|---|---|---|---|
| 1 | Start | - | 0 days |
| 2 | a | 1 | 2 days |
| 3 | b | 2 | 5 days |
| 4 | c | 3 | 9 days |

FIG-14

Asset Requirements at Manufacturing Plant 1

| Asset Type | 23-Jul-13 | | | | | | | | 30-Jul-13 | | | | | | | | 6-Aug-13 | | | | | | | | 13-Aug-13 | | | | | | | |
|---|---|---|---|---|---|---|---|---|---|---|---|---|---|---|---|---|---|---|---|---|---|---|---|---|---|---|---|---|---|---|---|---|
| | Su | M | Tu | W | Th | F | Sa | | Su | M | Tu | W | Th | F | Sa | | Su | M | Tu | W | Th | F | Sa | | Su | M | Tu | W | Th | F | Sa | |
| Small Bin | 4 | 4 | 4 | 4 | 5 | 5 | 5 | | 5 | 4 | 4 | 4 | 4 | 6 | 8 | | 6 | 6 | 9 | 12 | 9 | 9 | 9 | | 9 | 9 | 10 | 4 | 4 | 4 | 4 | |
| Large Bin | 7 | 7 | 7 | 7 | 7 | 7 | 7 | | 7 | 7 | 7 | 7 | 7 | 7 | 8 | | 8 | 8 | 12 | 12 | 12 | 12 | 12 | | 12 | 13 | 13 | 7 | 7 | 7 | 7 | |
| Wheeled Rack | 1 | 1 | 1 | 1 | 1 | 1 | 1 | | 1 | 1 | 1 | 1 | 1 | 1 | 1 | | 1 | 1 | 5 | 5 | 5 | 5 | 6 | | 7 | 7 | 7 | 1 | 1 | 1 | 1 | |

METHOD FOR PREDICTING ASSET AVAILABILITY

CROSS REFERENCE TO RELATED APPLICATION

This application is a continuation-in-part of U.S. patent application Ser. No. 14/096,466, filed Dec. 4, 2013; the disclosure of which is incorporated herein by reference.

BACKGROUND OF THE INVENTION

1. Technical Field

The present invention relates to inventory management. More particularly, the present invention relates to advanced planning and scheduling with respect to inventory embodied as reusable assets in a supply chain. Specifically, the present invention relates to providing an accurate model of a supply chain assets, dwell times, turn times, and using this model to predict asset availability into the future.

2. Background Information

Asset tracking and inventory management are complex components of most modern businesses. The tracking of inventory levels, orders, sales, and deliveries is critical to understanding the global picture of a company's inventory levels. Companies may use inventory management systems to avoid product overstock and outages. However, one critical underlying component of a robust inventory management system is a precise count and location of the inventory itself. Compounding the asset tracking problem is the problem of employee theft, which by some estimates accounts for over 60% of all inventory losses. Therefore, there is a critical need in the art for a system which not only tracks assets by keeping a precise count and location information for each inventory item, but also prevents theft of these assets.

Further, while assets may be embodied in commercial products for ultimate sale to the consumer, assets may also be embodied in reusable containers which are a costly company asset. When assets such as reusable containers are lost or misplaced within the supply chain, it adds additional costs in many ways. Either more containers must be purchased, ultimately oversizing a fleet and reducing effective utilization to undesired levels, or to meet demand, expendable packaging must be purchased, which creates immediate loss. Potentially, the worst cost of all is production stopping as a result of packaging shortages or misallocations of inventory. Therefore, companies desire to keep track of their reusable assets through the entire supply chain process. Further, companies have a critical need to identify loss, pinch points, dwell times, and generate turn analysis, as well as other metrics, such as real-time inventory counts and the location and activity data for all reusable assets. Broadly speaking, there is a critical need in the art for a system which provides an accurate picture of a company's packaging supply chain, inventory, loss, dwells, turns, and utilizations.

BRIEF SUMMARY OF THE INVENTION

In one aspect, the invention may provide a method for predicting asset availability, the method comprising the steps of: providing a plurality of reusable assets, wherein each asset in the plurality of assets is sent away from the first entity, and wherein each asset in the plurality of assets is received back at the first entity; sensing when each asset in the plurality of assets is sent away from the first entity and updating a database with an incoming time; sensing when each asset in the plurality of assets is received back at the first entity and updating a database with an arrival time; calculating one of a dwell time for each asset in the plurality of assets and a turn time for each asset in the plurality of assets, wherein the dwell time is the time elapsed between the incoming time and the next outgoing time for each asset in the plurality of assets, and wherein the turn time is the time elapsed between the outgoing time and the next incoming time for each asset in the plurality of assets; constructing an asset requirements schedule for the first entity, wherein the asset requirements schedule specifies a required amount of assets in the plurality of assets required at the first entity for each successive increment of time in a plurality of increments of time; using the one of the dwell time and turn time for each asset in the plurality of assets to forecast a forecast amount of assets in the plurality of assets available at the first entity for each successive increment of time in the plurality of increments of time; and comparing the required amount of assets and the forecast amount of assets for each successive increment of time in the plurality of increments of time to determine whether the forecast amount of assets is sufficient for each increment of time.

In another aspect, the invention may provide a method for predicting asset availability, the method comprising the steps of: constructing an asset requirements schedule for use with a plurality of assets, wherein the asset requirements schedule specifies an amount of assets in the plurality of assets required at each location in a plurality of locations for each successive increment time in a plurality of increments of time; constructing an asset path schedule for use with the plurality of assets, wherein the asset path schedule specifies a series of locations in the plurality of locations for each asset in the plurality of assets, and wherein the series reflects the desired physical movement of the associated asset between locations in the plurality of locations; sensing when an asset in the plurality of assets arrives at a location in the plurality of locations, updating a database with an incoming time associated with the asset and the location and updating the database with a current location in the plurality of locations of the asset; sensing when the asset leaves the location and updating the database with an outgoing time associated with the asset and the location; calculating a dwell time for the asset at the location by comparing the incoming time and the outgoing time and associating the dwell time with the location; repeating the sensing and calculating steps to determine and associate at least one dwell time with each location in the plurality of locations; comparing the dwell times for each location in the plurality of locations, the current locations of each asset in the plurality of assets, and the asset path schedule to construct a model depicting a predicted location of each asset in the plurality of assets for each increment of time in the asset requirements schedule; and comparing the model with the assets requirement schedule to predict whether the distribution of each asset in the plurality of assets at each location in the plurality of locations is sufficient for each increment of time in the asset requirements schedule.

In another aspect, the invention may provide a method for predicting asset availability, the method comprising the steps of: sending a plurality of assets between a plurality of locations in accordance with an asset path schedule; sensing when any asset in the plurality of assets is received at any location in the plurality of locations and storing a receipt timestamp and a current location in a database; sensing when any asset in the plurality of assets is sent from any location in the plurality of locations and storing a sent timestamp in the database; calculating a travel time for each asset in the plurality of assets between each location in the plurality of locations by comparing the receipt timestamp, sent timestamp, and current location for each asset in the plurality of assets at each location in the plurality of locations and storing the travel time in the database; calculating a dwell time for each asset in the plurality of assets between each location in the plurality of locations by comparing the receipt timestamp, sent timestamp, and current location for each asset in the plurality of assets at each location in the plurality of locations and storing the dwell time in the database; constructing an asset requirements schedule for use with the plurality of assets, wherein the asset requirements schedule specifies a required amount of assets of the plurality of assets required at each location in the plurality of locations for each increment of time in a plurality of increments of time; modeling the movement of each asset in the plurality of assets between locations in the plurality of locations for each increment of time in the plurality of increments of time by using the asset path schedule, dwell times, and travel times to determine when to model a particular asset in the plurality of assets moving to a particular location in the plurality of locations; comparing the modeled amount of assets in the plurality of assets with the required amount of assets in the plurality of assets for each increment of time in the plurality of increments of time; and notifying a higher authority if the comparing step determines a particular location in the plurality of locations is modeled to have less than the required amount of assets for a particular increment of time in the plurality of increments of time.

BRIEF DESCRIPTION OF THE SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 4 is a table showing exemplary data gathered and stored by the present invention;

FIG. 8 is a sample database table representing physical locations in the present invention;

FIG. 9 is a sample database table representing assets in the present invention;

FIG. 10 is a sample database table representing asset history in the present invention;

FIG. 11 is a sampling of common database queries in the present invention;

FIG. 12 is a sample report of dwell times at locations in the present invention;

FIG. 13 is a sample production schedule for use with the present invention;

FIG. 14 is a sample asset requirements schedule for use with the present invention.

Similar numbers refer to similar parts throughout the drawings.

DETAILED DESCRIPTION OF THE INVENTION

Figure 1:
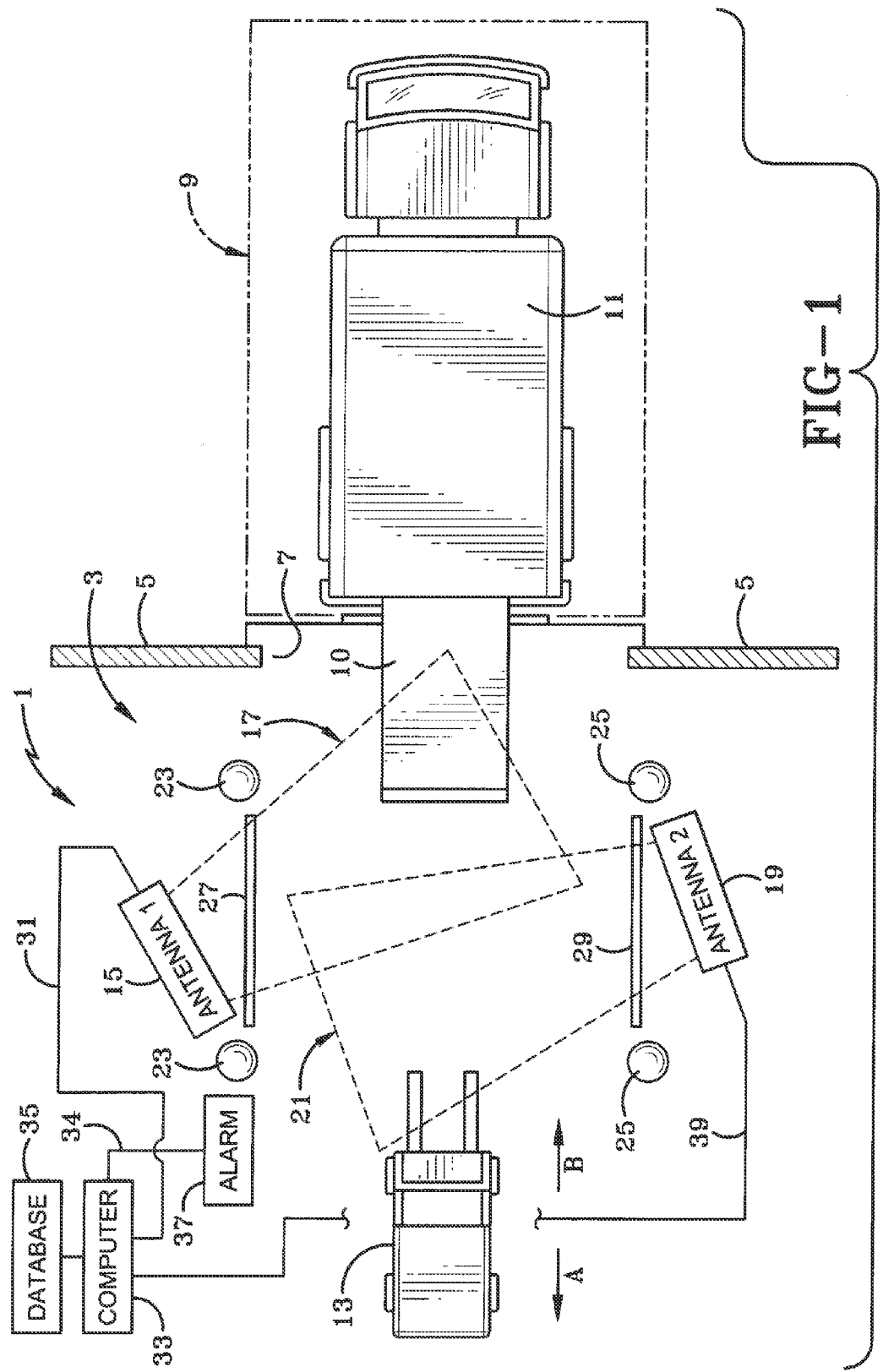
FIG. 1 is a top view of a delivery area of a structure incorporating the present invention.

A gate system is shown in FIGS. 1-5 and referred to generally herein as gate system 1. Various non-novel features found in the prior art relating to gate system 1 are not discussed herein. The reader will readily understand the fundamentals of electromagnetic wave propagation, antenna design, and signal processing are well within the prior art and readily understood by one familiar therewith.

Gate system 1 is adapted to work in conjunction with a building or structure 3 which includes a wall 5 defining an opening 7. Opening 7 is typically embodied in an entranceway into structure 3 at a loading dock area 9, and may be selectively sealable with a door (not shown). As typical in a loading dock, a truck 11 may be positioned proximate opening 7 with a platform 10 extended therefrom and through opening 7 for transferring items between truck 11 and structure 3. A forklift 13 is provided in FIG. 1 for reference and may be used to aid in transferring items between truck 11 and structure 3.

As shown in FIG. 1, a first antenna 15 is disposed within structure 3. First antenna 15 is preferably a directional antenna having a first radiation pattern 17 emanating therefrom in a particular direction. As shown in FIG. 1, first antenna 15 is angled such that first radiation pattern 17 is angled generally towards opening 7. As commonly understood in the prior art, an item emanating a signal in the proper frequency will be received by first antenna 15 when the item is within first radiation pattern 17. Conversely, inasmuch as first antenna 15 is preferably a directional antenna, the signal will not be received by first antenna 15 when the item is outside of first radiation pattern 17. A second antenna 19 is also disposed within structure 3. Second antenna 19 is preferably a directional antenna having a second radiation pattern 21 emanating therefrom in a particular direction. As shown in FIG. 1, second antenna 19 is angled such that second radiation pattern 21 is angled generally away from opening 7. Similar to first antenna 15, any properly formatted signal emanating from an item within second radiation pattern 21 will be received by second antenna 19, as second antenna is preferably a directional antenna. Also similar to first antenna 15, second antenna 19 will not receive signals emanating from outside second radiation pattern 21.

First antenna 15 is positioned behind a first set of bumpers 23 while second antenna 19 is positioned behind a second set of bumpers 25. First set of bumpers 23 provide protection for first antenna 15 while second set of bumpers 25 provide protection for second antenna 19 and both sets of bumpers 23 and 25 are made from a sturdy material, such as steel or reinforced aluminum. Bumpers 23 and 25 are provided to protect antennas 15 and 19, respectively, as warehouses and stockroom areas are often chaotic with forklifts 13 and various other equipment such as dollies constantly moving thereabout. First antenna 15 is further positioned behind first shield 27 while second antenna 19 is further positioned behind second shield 29. While first set of bumpers 23 and second set of bumpers 25 are preferably metallic, first shield 27 and second shield 29 are preferably made from plastic or another similar material which efficiently facilitates the passing through of electromagnetic signals. First shield 27 and second shield 29 are formed from non-metallic material to allow first antenna 15 and second antenna 19 to send and receive signals therethrough.

As shown in FIG. 1, first antenna 15 is connected to a computer 33 by way of a first connection 31. First connection 31 may be a wired or wireless connection for providing a communications mechanism between a first antenna 15 and computer 33. Computer 33 may be any style of computing device, and may include a processor (not shown) coupled with a memory (not shown). Computer 33 is connected to a database 35 for storing information relevant to gate system 1. Computer 33 is also connected to an alarm 37 by way of an alarm connection 34. Alarm connection 34 may be a wired or wireless communication mechanism and provides for data communication between computer 33 and alarm 37. Alarm 37 may be any style of alarming type of system which includes an audible alarm, a silent alarm, or any other type of alert system, including alerting a particular personnel of building 3. Similar to first alarm 15, second alarm 19 is connected to computer 33 by way of a second connection 39. Second connection 39 may be a wired or wireless connection and provides a mechanism for transferring data between computer 33 and second antenna 19. First antenna 15 and second antenna 19 provide information and data relating to signals received thereby and transfers this data to computer 33 by way of first connection 31 and second connection 39, respectively.

Figure 2:
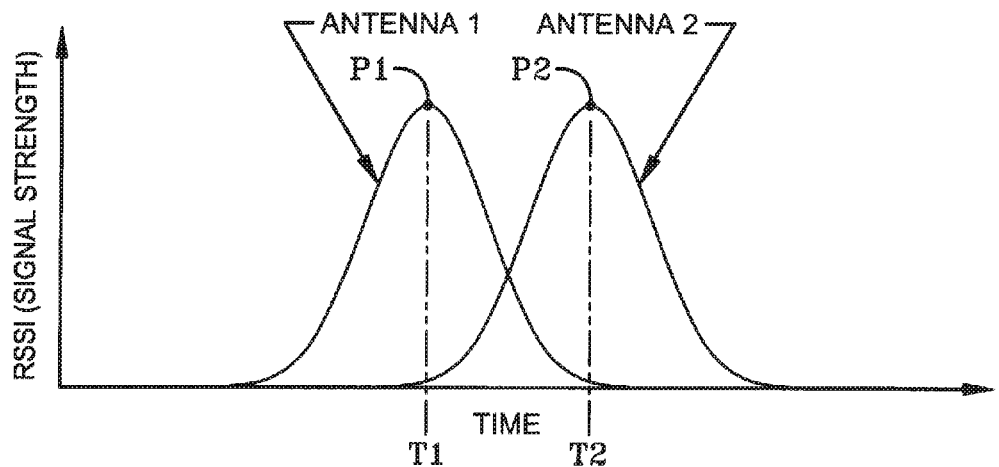
FIG. 2 is a graph representing received signal strengths during an amount of time in the present invention.

As seen in FIG. 2, a graph is provided depicting signal strength in the Y axis and relative to a time duration in the X axis. As an item emanating a signal passes between first antenna 15 and second antenna 19, first antenna 15 and second antenna 19 receive the signal along with its varying signal strength as it passes through first radiation pattern 17 and second radiation pattern 21, respectively. This information is transferred to computer 33 by way of first connection 31 and second connection 39. Computer 33 processes this signal strength information which is represented graphically in FIG. 2. As shown in FIG. 2, the signal strength of the signal passing through first radiation pattern 17 of first antenna 15 gradually swells until peak P1 at time T1, then tapers off as time continues. This represents the item passing through first radiation pattern 17. As the item passes through first radiation pattern 17, the signal strength of the signal emanating therefrom grows as the item approaches its nearest point to first antenna 15. After the item passes this nearest point at time T1, the item moves away therefrom and the respective signal strength of the signal dissipates accordingly. The same scenario happens as the item passes second antenna 19. As shown in FIG. 2, the relative signal strength of the signal emanating from the item grows and swells to peak P2 at time T2 which reflects second antenna 19 positioned differently than first antenna 15. Computer 33 recognizes time T1 occurs before time T2 and thus deduces the item is moving past first antenna 15 first and past second antenna 19 second. It follows that item must be moving from the exterior of building 3 into the interior of building 3 in the direction of Arrow A (FIG. 1).

Figure 3:
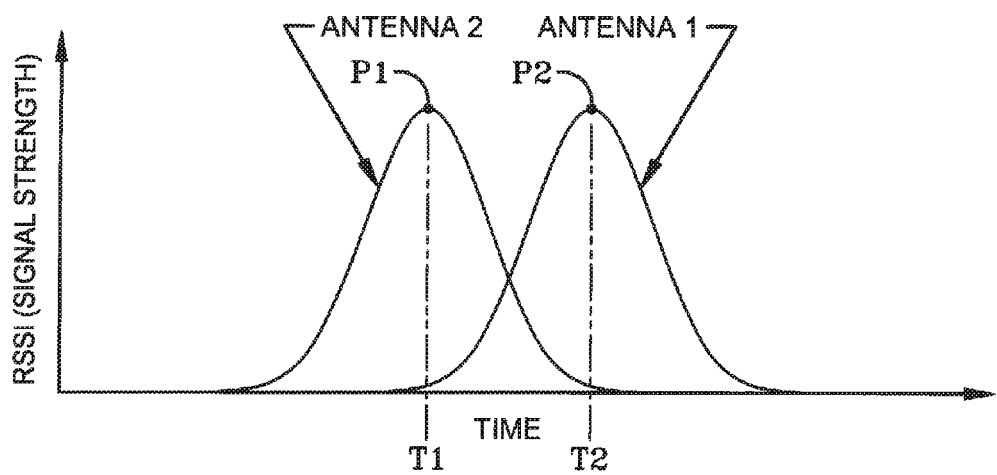
FIG. 3 is a graph representing received signal strengths during an amount of time in the present invention.

As shown in FIG. 3, second antenna 19 receives a peak signal P1 at time T1 while first antenna 15 receives a peak signal P2 at a time T2, which is later than time T1. This allows computer 33 to deduce that the item is traveling from the interior of building 3 towards loading dock area 9, in the direction of Arrow B (FIG. 1). As shown in FIGS. 2 and 3, computer 33 compares data from first antenna 15 and second antenna 19 and ensures there is an overlap of signal readings which is shown generally between T1 and T2. This signifies the item traveled through both radiation pattern areas, including first radiation pattern 17 and second radiation pattern 21. System logic may be implemented to ignore any incoming signals from only one antenna if computer 33 does not receive an overlapping signal as shown in FIGS. 2 and 3. These false positives may be triggered by merchandise being moved within truck 11 to make room for forklift 13 or any other reason merchandise may need to be moved yet not pass all the way through both radiation patterns. As shown in FIG. 4, a database table 41 is provided as an exemplary embodiment of data storage within database 35. Database table 41 stores data provided to computer 33 by first antenna 15 and second antenna 19. Database table 41 generally includes information relating to antenna signals generated by a particular item and the direction this item traveled through gate system 1. As such, a key column 43 is provided to represent unique identifiers correlated to an item needing to be tracked. A column 45 is provided for storing information relating to each item and the first antenna 15 peak time with respect to that item. Column 45 represents the time in which first antenna 15 receives the strongest signal from the associated item found in column 43. For example, with respect to FIG. 2, column 45 would store time T1 therein. Database table 41 also includes a column 47, which stores information relating to second antenna 19 peak time with respect to each item. For example, as shown in FIG. 2, column 47 would store time T2 therein. When a database row is created for a new item, a column 49 is set to null or no value therein. Similarly, when a new item is created in database 41, a column 51 is created and also set to null or no data. Column 49 represents whether computer 33 determines the respective item was loaded into the warehouse. Similarly, column 51 represents the determination made by computer 33 as to whether the particular item found in column 43 was loaded into the vehicle. Database table 41 also includes an expected direction column 52. Column 52 indicates whether the row item is expected to be received into the warehouse or received into the truck. The data in this column may be maintained by the manufacturer or a global inventory management system or any other mechanism which may supply the data indicating where the item in that particular row should be received.

By way of example, populating a row of database table 41 is now described with respect to row A. Cell 43A of database table 41 is populated with an identification key representing an item intended for use with gate system 1. Specifically, cell 43A includes the entry '00246' which represents an item in database table 41. Cell 45A includes a time stamp of '11:22:08:12' which represents the precise time first antenna 15 received the strongest signal from the item. Cell 47A includes entry '11:22:09:14' which represents precisely when second antenna 19 received the strongest signal emanating from the item. One will recognize that the time stamp within cell 47A is about one second later than the time stamp in cell 45A. Thus, inasmuch as the timestamp for second antenna 19 is later than the timestamp for first antenna 15, computer 33 may deduce that item '00246' traveled in the direction of Arrow A (FIG. 1) and was received into building 3. Thus, computer 33 indicates in cell 49A that item '00246' was affirmatively loaded into building 3, overwriting the default null value which previously resided in cell 49A. Cell 51A remains set to null as computer 33 did not update this cell because item '00246' was not loaded into the vehicle according to the signals received by first antenna 15 and second antenna 19.

Thereafter, item '00246' is accounted for and a user interested in any data relating to item '00246' may look at database table 41 and see that item '00246' was loaded into building 3 at approximately 11:22:09:14. One will readily recognize that a date column or more data may be added to database table 41 in conformance with any requirements a user or an implementor of gate system 1 may require.

System logic may be implemented to actuate alarm 37 when an item is indicated as already being either loaded into building 3 or loaded into truck 11 and first antenna 15 and second antenna 19 receive a signal emanating from this item indicating it is again moving. For example, if computer 33 determines item '00246' is being loaded into truck 11 having already been loaded into building 3, as shown in cell 49a, computer 33 may actuate alarm 37, as this would indicate the item is potentially being stolen or at least creating an anomalous situation. As such, database table 41 may also include column 52 relating to an expected direction in which the item is expected to travel within gate system 1. For example, item '00246' is associated with an expected direction of received "into warehouse," and first antenna 15 and second antenna 19 determine item '00246' is not moving in the expected direction, computer 33 may actuate alarm 37. This and other system logic may be implemented to utilize the data available via first antenna 15 and second antenna 19, particularly with respect to the direction the items are traveling within gate system 1.

Figure 5:
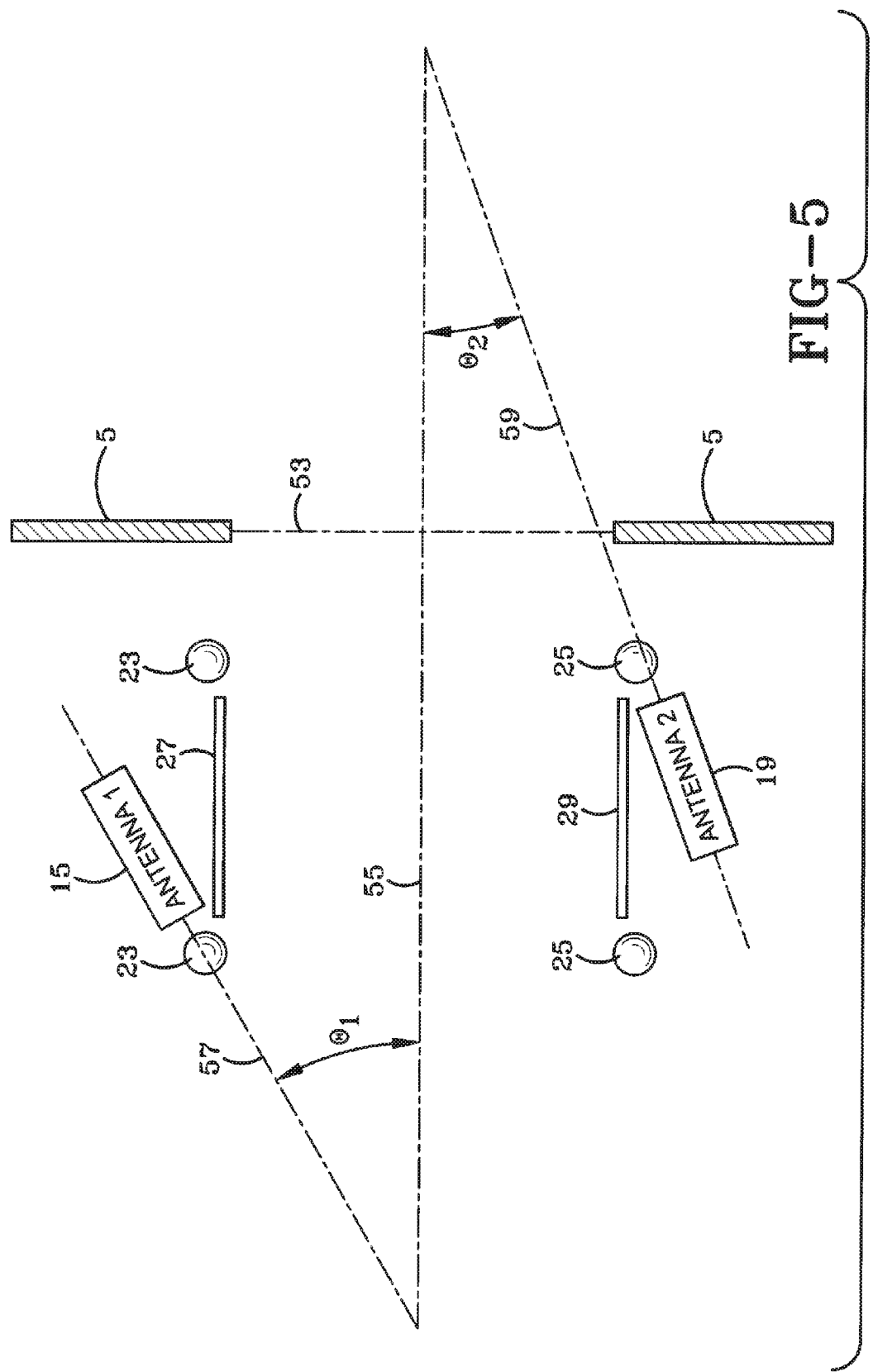
FIG. 5 is a top view similar to FIG. 1, showing relative angles of antennas in the present invention.

As shown in FIG. 5, gate system 1 may include an imaginary line 53 extending parallel with wall 5. Gate system 1 may further include an imaginary line 55 extending perpendicularly to imaginary line 53. As shown in FIG. 5, each antenna in gate system 1 includes an imaginary longitudinal line extending therethrough. More particularly, first antenna 15 includes an imaginary first longitudinal line 57 extending therethrough while second antenna 19 includes an imaginary second longitudinal line 59 extending therethrough. First longitudinal line 57 extends at an angle theta 1 with respect to imaginary line 55. Similarly, second longitudinal line 59 extends at an angle theta 2 with respect to imaginary line 55. In a preferred embodiment of gate system 1, theta 1 is equal to approximately 30°, while theta 2 is equal to approximately 20°. Thus, one will readily recognize first antenna 15 is offset from the parallel relationship with second antenna 19 by about 10° in the preferred embodiment. When viewed with respect to FIG. 1, this allows the associated radiation patterns to overlap while still providing sufficient coverage of opening 7 and the internal areas of building 3.

Figure 6:
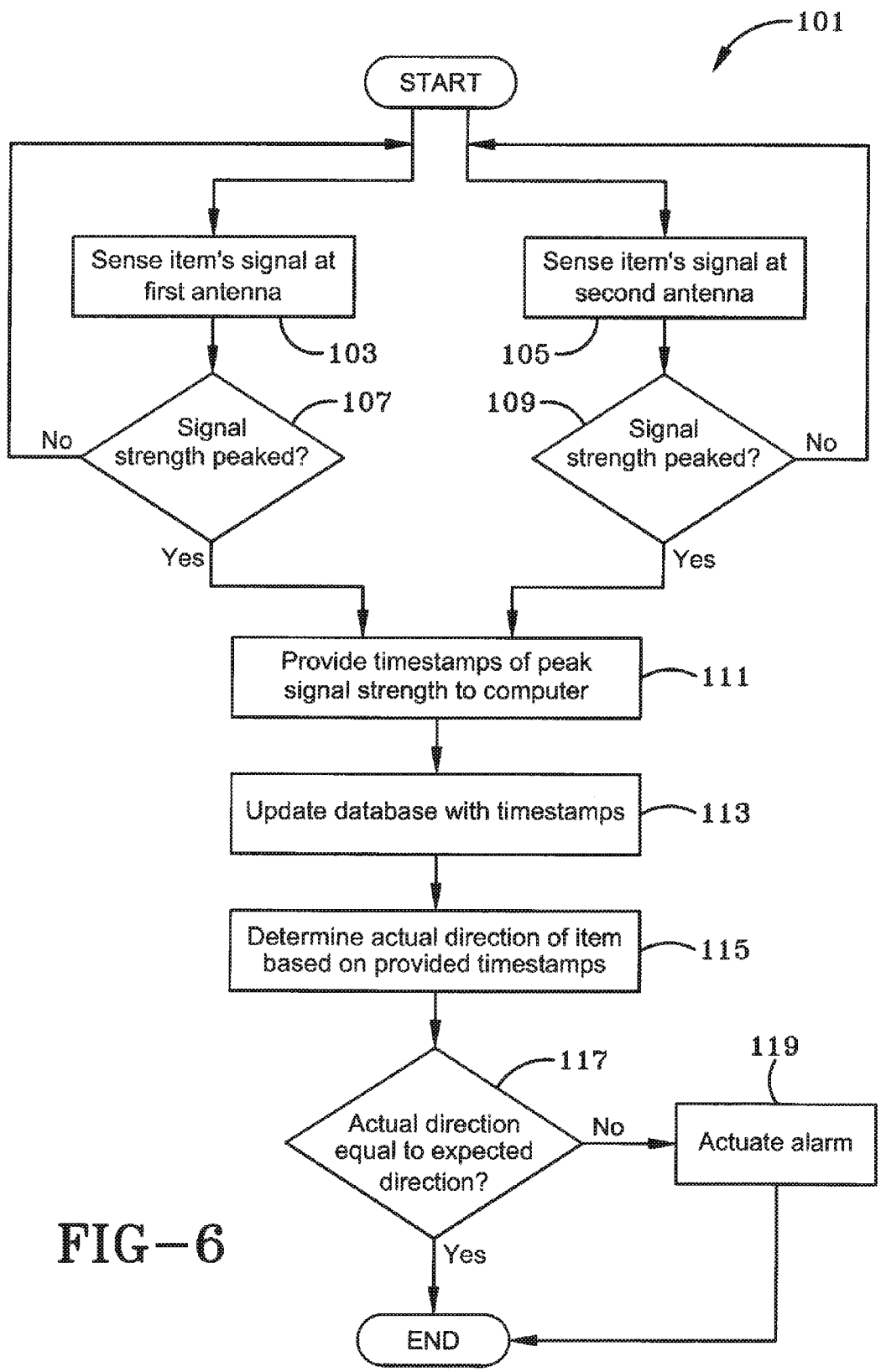
FIG. 6 is a diagram depicting a method of the present invention.

As shown in FIG. 6, gate system 1 includes a method 101. Method 101 begins and simultaneously enters both a step 103 and a step 105. In step 103, the first antenna of the present invention senses an item's signal. Step 103 then moves to a step 107. In step 105, the second antenna of the present invention senses the item's signal. Step 105 then moves to a step 109. In step 107, a determination is made as to whether the sensed signal is at its peak signal strength. If it is, step 107 proceeds to a step 111. If the signal sensed in step 107 is not at its peak signal strength, step 107 proceeds back to step 103 to repeat the sensing process. In step 109, a determination is made as to whether the sensed signal is at its peak signal strength. If it is, step 109 proceeds to step 111. If the signal sensed in step 109 is not at its peak signal strength, step 109 proceeds back to step 105 to repeat the sensing process. Step 111 collects the timestamp collected by the first antenna and provided by step 107 and the timestamp collected by the second antenna and provided by step 109 and provides these two timestamps to the computer. Step 111 thereafter proceeds to a step 113. Step 113 updates the database by entering the two timestamps in the appropriate database table(s) associated with the item and proceeds to a step 115. In step 115, the computer determines the actual direction of the item based on the timestamp acquired from the first antenna and the timestamp acquired from the second antenna and proceeds to a step 117. Step 117 determines whether the actual direction is equal to the expected direction. If the actual direction is equal to the expected direction, step 117 proceeds to end method 101. If step 117 determines that the actual direction is not equal to the expected direction, step 117 proceeds to a step 119. In step 119, the alarm is actuated as the item is traveling in an unexpected direction which may indicate a theft situation or another anomaly. Step 117 thereafter proceeds to end method 101.

Figure 7:
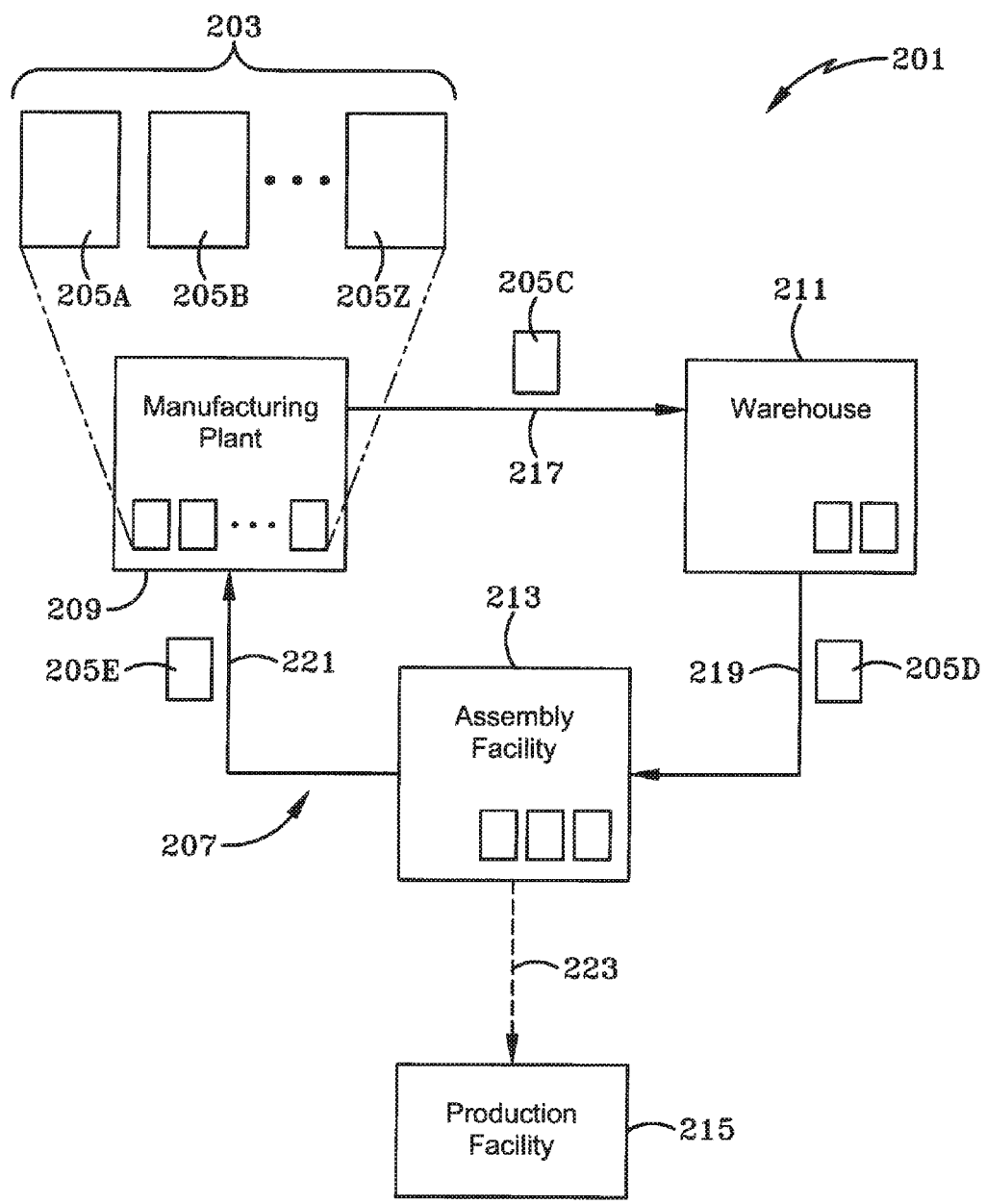
FIG. 7 is a diagram depicting an exemplary supply chain topography with assets moving between locations.

The present invention includes a method 201 adapted to work in conjunction with a plurality or a fleet 203 of assets 205 as they move throughout a supply chain 207. Assets 205 may be embodied in reusable containers which are costly and therefore extremely important in supply chain 207. As shown in FIG. 7, supply chain 207 is comprised of a plurality of physical structures coupled with routes extending therebetween as needed. As shown in FIG. 7, an exemplary supply chain 207 is comprised of physical structures such as a manufacturing plant 209 feeding assets 205 to a warehouse 211, which thereafter feeds assets 205 to an assembly facility 213. Assembly facility 213 assembles products and passes these assembled products on to a production facility 215 run by a third party. Assembly facility 213 then passes assets 205 back to manufacturing plant 209 to complete the directed loop of assets 205 through supply chain 207. Supply chain 207 further includes a plurality routes, whereby assets 205 move between physical structures by way of these routes. For example, as shown in FIG. 7, a route 217 extends between manufacturing plant 209 and warehouse 211, a route 219 extends between warehouse 211 and assembly facility 213, and a route 221 extends between assembly facility 213 and manufacturing plant 209. Finally, a route 223 extends between assembly facility 213 and production facility 215. Route 217, route 219, route 221, and route 223 may be any commonly known method of moving goods from one physical location to another, including manual moving of assets 205, movement using automobiles, airplanes, boats, or any combination of these. By way of example, a particular asset 205C is shown moving along route 217 from manufacturing plant 209 to warehouse 211. Similarly, a particular asset 205D is shown moving along route 219 and a particular asset 205E is shown moving along route 221. In practice, routes may be unidirectional where an asset 205 is always sent from one physical structure to another, or bi-directional where an asset 205 may be sent back and forth between two physical structures. The set of physical locations and routes are hereinafter referred to generically as a plurality of locations 208. A user may construct an asset path schedule for use with fleet 203 of assets 205, wherein the asset path schedule specifies a series of locations 208 for each asset 205, and wherein the series reflects the desired physical movement of the associated asset 205 between locations 208. The asset path schedule may be incorporated by a user into method 201 or it may be deduced by other information available in method 201.

Method 201 may utilize directional gate system 1 or similar at each physical structure. As such, each asset 205 is coupled with a tag 225 which emits a signal received by first antenna 15 and second antenna 19 as described above. As such, any asset 205 entering or leaving a physical structure is automatically sensed and processed and the direction of the particular asset 205 and a timestamp is stored in database 35. Note that an instance of first antenna 15 and second antenna 19 is disposed at each physical location in supply chain 207 and are used thereby for sensing when an asset 205 enters or leaves the physical location.

Directional gate system 1 is preferably implemented using radio frequency identification technology, which is a non-line-of-site technology. Therefore, method 201 doesn't require the individual tags 225 to be facing a certain direction on assets 205. Method 201 further doesn't require tags 225 to be exposed on a pallet. Method 201 with directional gate system 1 is quicker than a traditional barcode method as the reader can process hundreds of tags 225 at a time, unlike an employee seeking and manually scanning individual barcodes. As discussed above, by incorporating directional gate system 1 into method 201, assets 205 are automatically determined to be either entering or leaving a physical structure and the database entry is stored in database 35 accordingly.

For reference, database 35 is a globally updatable and accessible database for use in storing and providing information in method 201. Under method 201, database 35 may include several database tables for use in storing and providing information required for the efficient use of method 201. As such, FIG. 8 portrays one embodiment of a table 227 containing data relating to the plurality of locations 208 which are comprised of the physical locations and routes defined by method 201; FIG. 9 portrays one embodiment of a table 229 containing data relating to the assets defined by method 201; and FIG. 10 portrays one embodiment of a table 231 containing data relating to the forecasting performed in method 201.

As shown in FIG. 8, table 227, hereinafter referred to as locations table 227, includes unlimited rows with each row signifying one of the plurality of locations 208 in method 201, and wherein each row includes four columns. Locations table 227 includes a column 233 which provides a unique reference key for every row in locations table 227. Locations table 227 further includes a column 235 which provides a description of a location stored in locations table 227. This description may be a string of characters in a "human readable" format for storing a quick reference one of the plurality of locations 208 in supply chain 207, whereby locations 208 may be a physical structure or a route between physical structures. For example, cell 235A describes the referenced location as "Manufacturing Plant," while cell 235B describes the referenced location as "En route to warehouse from manufacturing plant." The data stored in column 235 is user entered and specific to each embodiment of supply chain 207. As such, method 201 may provide an interface for prompting the user to enter and update data stored in table 227, particularly the data in column 235 regarding location names. Each row in locations table 227 represents one of the plurality of locations 208 in database form. Locations table 227 further includes a column 237 which relates to the current average dwell time of assets 205 disposed at that particular location. Locations table 227 further includes a column 239 which relates to the maximum dwell time for assets 205 disposed at that particular location. The details of how columns 237 and 239 are populated are discussed in greater detail below.

As shown in FIG. 8, table 229, hereinafter referred to as assets table 229, includes unlimited rows with each row signifying an asset in method 201, and wherein each row includes five columns. As such, assets table 229 represents fleet 203 in database form. Assets table 229 includes a column 241 which provides a unique reference key for every row in assets table 229. Assets table 229 further includes a column 243 which provides the tag identifier of a particular tag 225 associated with a particular asset 205. This may be an RFID identification token if tags 225 are embodied as an RFID tag, or any other way to provide a correlation between a particular tag 225 and a particular asset 205. Assets table 229 further includes a column 245 which provides information as to the current location in the plurality of locations 208 of a particular asset 205. This information is provided by way of one of the keys in column 233 of locations table 227. With respect to relational database terminology, locations table 227 and assets table 229 are linked in that the primary keys of column 233 of locations table 227 populate column 243 of assets table 229 to indicate the particular location 208 of each asset 205. For example, for asset 205 having the key of "2," the number "3" is disposed in cell 245B of assets table 229, which relates to key 233A of locations table 227. As shown in cell 235B, the location name associated with key "3" is "Warehouse." Thus, the asset 205 with the key of "2" as shown in cell 241B is currently residing at warehouse 211 of supply chain 207, which is indicated by the data in cell 245B.

As shown in FIG. 9, assets table 229 also includes a column 247. Column 247 is automatically populated with a timestamp generated by directional gate system 1 as assets 205 pass one or both of first antenna 15 and second antenna 19. As described above, first antenna 15 and second antenna 19 sense when a particular tag 225 moves past and generates a timestamp relating to this time. As discussed with directional gate system 1, the direction the particular asset 205 is moving as well as the timestamp may be the calculated by sensing the signal strength of tag 225. The timestamp is passed to database 35 and stored in the cell of column 247 which is associated with the appropriate sensed tag identifier in column 243. The location information from either first antenna 15 or second antenna 19 is also provided to database 35 for storage in the cell of column 245 which includes the sensed tag. For example, first antenna 15 is disposed at assembly facility 213 and senses tag identifier "693" pass thereby, which according to asset table 229, indicates that asset 205 having the key "5" has passed thereby. First antenna 15 passes data relating to the exact time tag identifier "693" was sensed by first antenna 15 as well as the location of first antenna 15. In this example, database 35 updates the row of assets table 229 containing tag identifier "693" with the current location information and the generated timestamp. As shown in cell 245E, the current location is referenced as "5" which is correlates to "Assembly facility" in the locations table 227. Further, cell 247E is updated with the timestamp provided by first antenna 15 when asset "5" passed thereby.

Assets table 229 further includes a column 249 which includes information relating to the type of asset 205 that is represented by the database row. For example, asset 205 having the key "1" is indicated to be a "Large bin," while asset 205 having the key "4" is indicated to be a "Wheeled rack." This information is user generated and may alternatively be embodied in a separate database table of asset types. As such, column 249 may include foreign key references to the asset type table in such a configuration. Additional rows of assets table 229 may be added by a user or administrator anytime a new asset 205 is introduced into supply chain 207. Likewise, rows of assets table 229 may be deleted by a user or administrator anytime a particular asset 205 is retired from fleet 203.

As shown in FIG. 10, table 231, hereinafter referred to as asset history table 231, includes unlimited rows with each row relating to the movement of a particular asset into and out of a particular location 208 specified in locations table 227. In general, asset history table 231 keeps historical information in database form regarding the relationship between a particular asset 205 and a particular location 208, including the time the asset entered the location 208, the time the asset left the location 208, and the calculated dwell time of the particular asset 205 at that particular location 208. Pursuant to this, each row in asset history table 231 includes six columns. Asset history table 231 includes a column 251 which provides a unique reference key for every row of asset history table 231. In database terminology, the entries of column 251 are known as the "primary keys" for asset history table 231. Asset history table 231 further includes a column 253 which provides a foreign key reference to assets table 229, in particular a reference to one of the primary keys found in column 241 of assets table 229. This reference relates each row in asset history table 231 to a particular asset 205. Asset history table 231 further includes a column 255 which provides a foreign key reference to locations table 227, in particular a reference to one of the primary keys found in column 233 of locations table 227. This reference relates each row in asset history table 231 to a particular location 208 in supply chain 207.

Asset history table 231 further includes a column 257 which provides information relating to when the particular asset 205 indicated in column 253 of the row was received into the particular location 208 indicated in column 255 of the row. In the exemplary embodiment, the information provided by column 257 is comprised of a timestamp provided by directional gate system 1. Similar to column 247 discussed above, column 257 is populated with a timestamp generated by directional gate system 1 as assets 205 pass one or both of first antenna 15 and second antenna 19. First antenna 15 and second antenna 19 sense when a particular tag 225 moves past and generates a timestamp relating to this time. As discussed with directional gate system 1, the direction the particular asset 205 is moving as well as the timestamp is calculated by sensing the signal strength of tag 225. This information is sent to database 35 and stored in column 257. Asset history table 231 further includes a column 259, which is similar to column 257. Column 259 provides information relating to when then particular asset 205 indicated in column 253 of the row was sent out from the particular location 208 indicated in column 255 of the row. In the exemplary embodiment, the information provided by column 259 is comprised of a timestamp provided by directional gate system 1 and is generated by the same underlying mechanics as described above for the information of column 257.

Asset history table 231 further includes a column 261 which provides information relating to the dwell time for the particular asset 205 indicated in column 253 of the row at the particular location 208 indicated in column 255 of the row. This information is derivable by taking the difference between when the particular asset 205 arrived at the particular location 208 and when the particular asset 205 left the particular location 208. As such, the information in column 261 for a particular row is derivable by taking the difference between the information in column 257 and column 259 for that particular row.

Once all of the columns for a particular row in table 231 are populated, the row and column data is generally not overwritten, updated, or deleted. Thus, table 231 provides a historical view of the information relating to how and when assets 205 move through supply chain 207. Reports and statistical analysis may be performed by extracting and manipulating the data stored in table 231. Reports may be generated indicating which location 208 in supply chain 207 is currently experiencing the greatest dwell time, or has the lowest average dwell time. Similarly, reports may be generated for a given date or time period to indicate which assets 205 were at what locations 208 during that time, or which locations 208 had beneficial dwell times, or any other available information. For example, a supply chain manager may wish to view which locations 208 are experiencing greater than acceptable dwell times for the past month. This information is readily available via a specially formatted database query using asset history table 231. The supply chain manager then may take managerial steps to address unacceptable dwell times at certain locations 208.

As shown in FIG. 11, various database queries may be formed and put forth to leverage the data stored in locations table 227, assets table 229, and asset history table 231. One important metric in method 201 are referred to as a "turn time." Turn times are the amount of time a particular asset 205 takes to leave a particular location 208, proceed through supply chain 207, return to the particular location 208, and proceed out again from the particular location. Turn times are readily deducible from querying asset history table 231 with a properly formatted database query. A human readable example of such a query is found in FIG. 11 as query Q1. Q1 asks "Average turn time for Asset 1 at Location 1," with method 201 responding with an Answer A1, where A1 is provided as 24.2 days.

Another important metric in method 201 is referred to as a "shrink rate." Shrink rate is the percentage of fleet 203 which has passed an antenna in directional gate system 1 during a particular time period. For example, method 201 may include a preformed data entry screen on a computer (not shown) connected to database 35 for reporting a shrink rate, with a prompt for the particular antenna and a prompt for the time range. The entered antenna and time range information is thereafter formed into a database query and sent to database 35. The result is then displayed on the computer or printed or emailed for consideration by a user. A similar example is found in FIG. 11 as query Q2. Q2 asks "Percentage of asset fleet passing through location 3 from Oct. 11, 2013 to Oct. 29, 2013," with method 201 responding with Answer A1, where A1 is provided as 42%. Note that Q2 asks for the percentage of fleet 203 passing through a location, rather than sensed by an antenna of directional gate antenna 1, which is a slight variation on the shrink rate concept.

Various other queries may be formed to exploit the data in database 35 relating to locations table 227, assets table 229, and asset history table 231. These queries may be in the form of user prompts on a computer screen with preformed query structures and text entry boxes or drop-down menus, or may be a free-form style of forming a specific query. For example, query Q3 asks for the "Current dwell time for Asset 3?" Q3 may be entered by a free form entry or by selecting menu options from an interface. As shown by an Answer A3, the current dwell time for Asset 3 is 10 days. Similar, Query Q4 asks for the "Current location of Asset 4?" As shown by an Answer A4, the current location of asset 4 is "En route to warehouse from manufacturing plant." A4 is derived from accessing assets table 229, selecting the row having key column 241 equal to "4," which is cell 241D. Database 35 then retrieves the foreign key of the current location in cell 245D, which is "2." The database 35 then selects the row of locations table 227 having "2" in key column 233, which is cell 233B. From this selected row, database 35 retrieves the location name from column 235, which resides in cell 235B and returns this to the user.

FIG. 12 shows an example dwell times report 262 which may be generated by method 201. Dwell times report 262 shows an asset identification number for a sampling of assets 205 along with the most recently experienced dwell times at each location that particular asset 205 traveled. Report 262 further computes an average dwell time for each location by taking the average of all of the dwell times experienced by the assets 205 in the chart. In this sample, Location 1 has experienced a recent average dwell time of 1.667 days; location 2 has experienced a recent average dwell time of 13 days; Location 3 has experienced a recent average dwell time of 2 days; and Location 4 has experienced a recent average dwell time of 3 days. An asset manager or fleet supervisor would readily understand a bottleneck is occurring at Location 2, based on report 262. The hard data provided by method 201 provides valuable feedback to supervisors or managers and valuable insight into the dwell times of the fleet with respect to each location.

As shown in FIG. 13, a production schedule 263 may be entered into method 201 for use in conjunction therewith. Coupling production schedule 263 with method 201 enables method 201 to perform advanced planning and scheduling optimization and alert the users of supply chain 207 to any future bottlenecks or issues relating to assets 205 vis-a-vis the requirements of production schedule 263 and the current dwell times of all the locations 208 in the supply chain 207. Method 201 may be formatted to accept a proprietary production schedule format or an industry standardized format for production scheduling, for example an Microsoft® Excel® sheet or a "Gantt Chart" style production schedule. Further, method 201 may allow a user to enter the production schedule into a user interface provided by method 201 to ensure data is entered into method 201 in a proper format. As shown in FIG. 13, production schedule 263 is a simplified sample production schedule which may be entered into method 201. A series of appropriate database tables and data storage is provided by method 201 for retaining the production schedule data. Production schedule 263 of FIG. 13 is formatted as a spreadsheet table having four columns. A column 265 includes an identification number for each task entry in production schedule 263. Column 265 contains any style of unique identifier for referencing the task entry. A column 267 includes a task name for each task entry in production schedule 263. The task names are human readable and easily identifiable alpha-numeric characters for providing a quick reference name or short description to a task, e.g. "load to dryer," "dry solvents," and "remove material from centrifuge." A column 269 includes a predecessor task identification number for each task entry in production schedule 263. The entries in column 269 provide the previous task identifier for which the current task depends and waits for completion. Finally, a column 271 includes a duration of time required to complete the associated task in production schedule 263, e.g. "2 days," or "5 days." Similar production schedules may be formed and entered into method 201 to provide method 201 with information relating to when and where asset 205 are needed. Tasks may be associated with locations 208 manually or by including this information in production schedule 263 for use by method 201.

As shown in FIG. 14, a related asset requirements schedule 273 may be deduced from production schedule 263. Alternatively, assets requirements schedule 273 may be entered into method 201 independently in addition to or in lieu of production schedule 263. Asset requirements schedule 273 may be used by method 201 to compare the current number of assets 205 at all of locations 208 in supply chain 207 and determine any current or future inventory issues regarding whether enough assets 205 will be in place at each location 208 for each time in asset requirements schedule. The exemplary asset requirements schedule 273 provided in FIG. 14 portrays time units or increments in days and grouped by weeks for convenience. However, any unit or increment of time which is relevant to the user may be incorporated into asset requirements schedule 273. As shown in FIG. 14, assets requirements schedule 273 reflects asset 205 requirements by day at "Location 1." For full implementation and accurate forecasting, an assets requirements schedule 273 must be provided for every location 208 in supply chain 207 so the entire scope of requirements may be considered with respect to fleet 203.

As shown in FIG. 14, asset requirements table 273 includes a column 275 for specifying what asset type is represented by the row, e.g. "large bin," "small bin," or "wheeled rack." Rather than full character descriptions of asset types, a numerical identifier from Asset table 229 and column 241 may be used instead, e.g. "1" or "2," etc. After column 241, four week columns 277 are provided, with each week column 277 having seven sub-columns, described hereinafter as day columns 279. Day columns 279 are directed to each day of the week for the week reflected in the associated week column 277. For example, week column 277A contains seven day columns 279A, 279B, 279C, 279D, 279E, 279F, and 279G. Each row under each day column 279 includes a number representing the number of assets 205 required at manufacturing plant 209 on the specified day for the asset reflected in column 275. For example, for the row specifying the asset type of "Small Bin," as specified under day column 279C of week column 279A, seven (7) assets 205 which are in the form of a "small bin" are required at manufacturing plant 209 on the Tuesday of the week starting on Jul. 23, 2013.

Asset requirements table 273 specifies how many assets 205 and what kind of assets 205 are needed at a particular location 208 in supply chain 207 on a particular day. Further, inasmuch as asset requirements table 273 provides information regarding asset requirements into the future, method 201 may provide advanced planning and forecasting regarding management of fleet 203. Future asset 205 bottlenecks or asset shortages 205 are forecasted and decision makers may be alerted to the issue well in advance.

To forecast availability of assets 205, method 201 steps through each specified increment of time while simultaneously correlating the flow of assets 205 in fleet 203 using the aforementioned dwell times, turn times, and shrink rates for each asset 205 and location 208 in supply chain 207. For example, if a location A has three assets 205 at a time T1 and a location B has three assets 205 at time T1, using asset requirements table 273, method 201 looks up the number of assets 205 required at locations A and B at time T1 and determines whether the required number of assets 205 are presently at these locations. If not, method 201 alerts either the location A or B which has insufficient assets 205, or a system manager in charge of asset oversight, or any other actor in method 201 who may be responsible or able to act on the information regarding insufficient asset 205 allocation. Method 201 thereafter steps to the next increment (i) of time to consider the asset requirements of locations A and B at a time T1+i. However, method 201 also accounts for and predicts the movement of assets 205 based on the dwell times, turn times, and shrink rates for assets 205 and locations 208 in method 201. As discussed above, method 201 calculates and stores the current average dwell time and maximum dwell time for each location 208. Thus, as method 201 steps to the next increment of time, each asset 205 is considered vis a vis the current average dwell time and maximum dwell time for the location 208 they currently reside. If method 201 deduces that a particular asset 205 will likely move to the next location 208 in supply chain 207, method 201 models asset allocation at time T1+i with that asset moved to the next location 208 in supply chain 207.

Method 201 may include a threshold or another predictability algorithm or metric for determining how and when to predict whether a particular asset 205 will move to the next location 208. These metrics can be tuned to the particular user or particular instance of method 201. For example, the underlying prediction algorithm may rely only on the maximum dwell time for each location 208 for predicting when a particular asset 205 will move to the next location. This is a conservative approach to predictive scheduling of the movement of assets 205 as this approach presupposes every asset 205 will spend the maximum time at a particular location 208 before moving to the next location. A less conservative approach incorporates the average dwell times rather than the maximum dwell times into the metrics used to predict asset 205 movement, A user may want to see a forecast of the both asset allocation algorithms with the conservative maximum dwell time approach juxtaposed with the less conservative average dwell time approach.

Regardless of the asset allocation scheme, once method 201 models the movement of assets 205 between locations, method 201 repeats the step of comparing assets 205 at a particular location 208 with the required number of assets 205 specified in asset allocation table 273. If a particular location 208 is found to be lacking in the required number of assets 205, method 201 alerts a user or whoever the specified decision maker is as to the deficiency. Thereafter, method 201 steps through the next increments of time, iteratively modeling the movement of assets 205 between locations 208 and thereafter determining if each location 208 is sufficiently supplied with at least the required number of assets 205. This is repeated for as far into the future as asset allocation table 273 provides.

Figure 15:
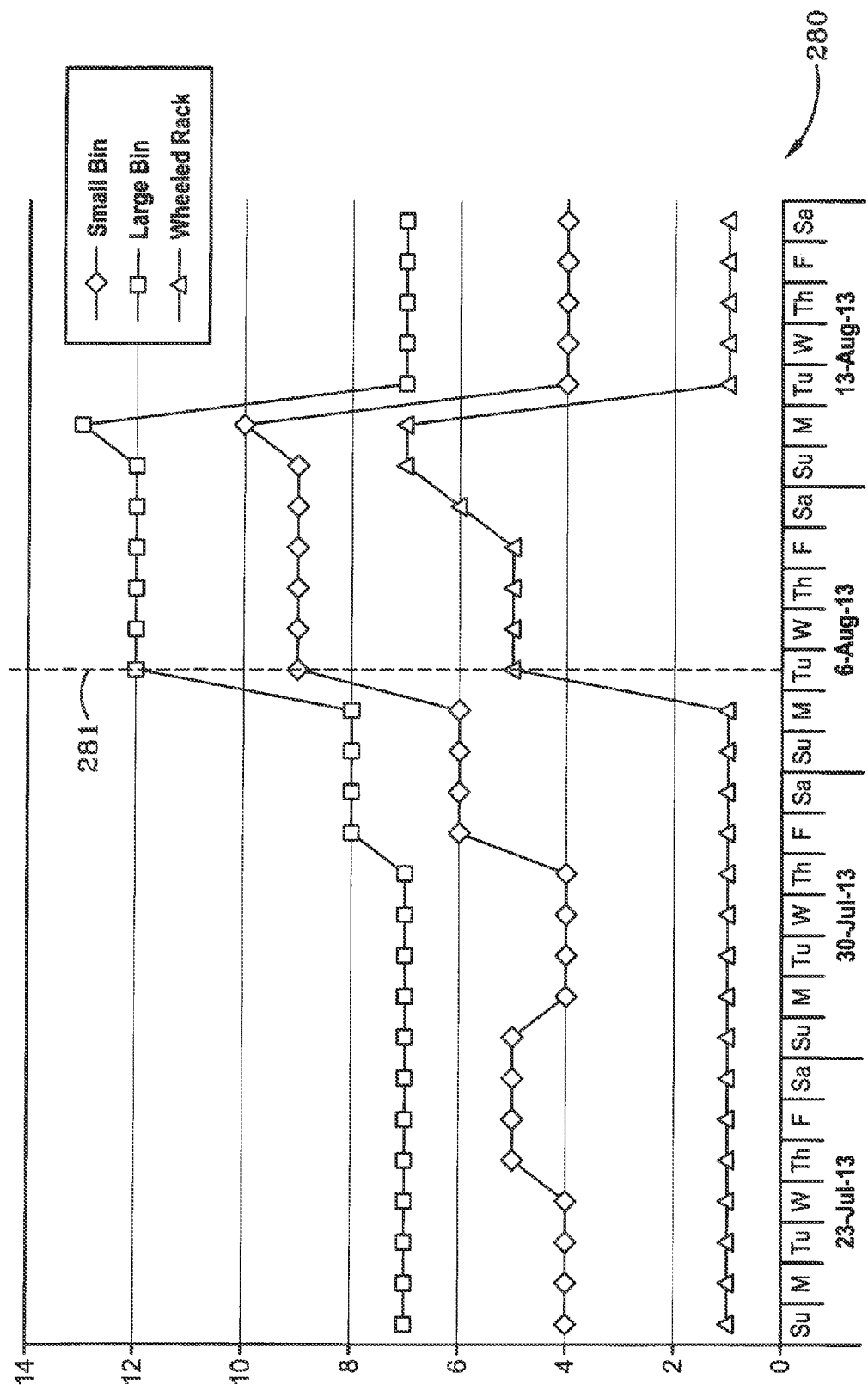
FIG. 15 is a line graph depicting the information in the asset requirements schedule.

The data of FIG. 14 is provided in a line chart 280 displayed in FIG. 15. One will readily note that asset requirements table 273 includes a spike in the requirements of all three asset types, wheeled rack, small bin, and large bin, on Tuesday of the week of Aug. 6, 2013. This is indicated by a dotted line 281 for clarity. The forecasting and asset allocation modeling of method 201 may provide a warning or valuable insight into increased production requirements when data such as that found in asset requirements table 273 is incorporated therein. Method 201 incorporates future increased rates or requirements into the modeling of future asset 205 movement and comparing the modeled distribution of each asset 205 with the asset requirements schedule. Thus, method 201 provides predictive modeling even in chaotic future environments and allows the users or higher authorities to make changes or adapt early to any future asset 205 shortages. These changes may include proactive movement of assets 205 or even acquiring additional assets 205 to meet the future demand.

"Logic," "logic circuitry," or "logic circuit," as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

In the foregoing description, certain terms have been used for brevity, clearness, and understanding. No unnecessary limitations are to be implied therefrom beyond the requirement of the prior art because such terms are used for descriptive purposes and are intended to be broadly construed.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

The invention claimed is:

1. A method for predicting asset availability, the method comprising the steps of:
   providing a tag on each asset in a plurality of assets;
   emitting a signal from each tag;
   sensing with a first antenna when an asset in the plurality of assets arrives at one of a plurality of locations, wherein sensing the asset is accomplished by reading the tag signal with the first antenna disposed at a first angle in a range from 25 degrees to 35 degrees measured from a longitudinal line extending through the first antenna to an imaginary line normal to a wall of a structure at each location in the plurality of locations;
   updating a database with an incoming time associated with the asset and the location;
   sensing with the first antenna when the asset leaves the location;
   updating the database with an outgoing time associated with the asset and location;
   calculating a dwell time for the asset at the location by comparing the incoming time and the outgoing time;
   updating the database with the dwell time associated with the asset and the location;
   predicting availability of the asset based on the incoming time and outgoing time maintained in the database, wherein this step of predicting availability is accomplished by forecasting a forecast amount of assets in the plurality of assets available at the location based on the dwell time associated with the asset in the plurality of assets, and comparing a required amount of assets and the forecast amount of assets to determine whether the forecast amount of assets is sufficient; and
   adapting to future asset shortages based on predicted availability of the asset.

2. The method of claim 1, further comprising the step of repeating the sensing and calculating steps to determine and associate at least one dwell time with each location in the plurality of locations.

3. The method of claim 1, further comprising the step of repeating the sensing and calculating steps to determine and associate at least one dwell time with each asset in the plurality of assets.

4. The method of claim 1, further comprising the step of repeating the sensing and calculating steps to determine and associate a dwell time for every asset in the plurality of assets with respect to every location in the plurality of locations.

5. The method of claim 4, further comprising the step of using the incoming times to determine a current location for every asset in the plurality of assets.

6. The method of claim 5, further comprising the steps of:
constructing an asset requirements schedule for use with the plurality of assets; and
specifying in the asset requirements schedule an amount of assets in the plurality of assets required at each location in the plurality of locations for each successive increment of time in a plurality of increments of time.

7. The method of claim 6, further comprising the steps of:
constructing an asset path schedule for use with the plurality of assets; and
specifying in the asset path schedule a series of locations in the plurality of locations for each asset in the plurality of assets; and
reflecting a desired physical movement of the associated asset between locations in the plurality of locations in the series.

8. The method of claim 7, further including the step of comparing the dwell times for each location in the plurality of locations, the current location for each asset in the plurality of assets, and the asset path schedule to construct a model depicting a predicted location of each asset in the plurality of assets for each increment of time in the asset requirements schedule.

9. The method of claim 8, further including the steps of:
comparing the model with the assets requirements schedule;
determining whether the modeled distribution of each asset in the plurality of assets at each location in the plurality of locations is less than the amount specified in the asset requirements schedule for each increment of time in the plurality of increments of time.

10. The method of claim 9, further including the step of sending an alert if the modeled distribution of each asset in the plurality of assets at each location in the plurality of locations is less than the amount specified in the asset requirements schedule for any one increment of time in the plurality of increments of time.

11. The method of claim 9, further including the step of initiating acquiring additional assets if the modeled distribution of each asset in the plurality of assets at each location in the plurality of locations is less than the amount specified in the asset requirements schedule for any one increment of time in the plurality of increments of time.

12. The method of claim 9, further including the step of forming and sending an email to a user if the modeled distribution of each asset in the plurality of assets at each location in the plurality of locations is less than the amount specified in the asset requirements schedule for any one increment of time in the plurality of increments of time.

13. The method of claim 9, further comprising the step of generating a report showing each increment of time in the plurality of increments of time juxtaposed with the amount specified in the asset requirements schedule at each location in the plurality of locations for each increment of time in the plurality of increments of time and the modeled distribution of each asset in the plurality of assets at each location in the plurality of locations for each increment of time in the plurality of increments of time.

14. The method of claim 4, further comprising the steps of:
selecting a time period;
selecting a selected location in the plurality of locations;
calculating a shrink rate for the time period at the selected location using the database, wherein the shrink rate is the percentage of the plurality of assets which arrives at the selected location during the time period.

15. The method of claim 14, further comprising the step of generating a report showing the shrink rate, the time period, and the selected location.

16. The method of claim 1, further comprising the steps of:
reading the tags with a second antenna disposed at a second angle in a range from 15 degrees to 25 degrees relative the imaginary line normal to the wall of the structure at each location in the plurality of locations; and
determining whether the asset associated with the sensed tag is arriving or leaving at a particular location in the plurality of locations by comparing a first time and a second time, wherein the signal emitted by the sensed tag is strongest at the first antenna at the first time, and wherein the signal emitted by the sensed tag is the strongest at the second antenna at the second time.

17. The method of claim 16, further comprising the steps of:
reading the tags passively with the first antenna; and
reading the tags passively with the second antenna.

18. The method of claim 17, further comprising the steps of:
emitting the signal as a radio frequency identification signal;
forming the first antenna as a radio frequency identification antenna; and
forming the second antenna as a radio frequency identification antenna.

19. The method of claim 1, wherein the asset is a reusable shipping container.

* * * * *